US012749594B2

(12) United States Patent
Tashiro et al.

(10) Patent No.: US 12,749,594 B2
(45) Date of Patent: Sep. 29, 2026

(54) FOAMED ELECTRIC WIRE, COMMUNICATION CABLE, AND METHOD OF MANUFACTURING THE SAME

(71) Applicant: Yazaki Corporation, Tokyo (JP)

(72) Inventors: Kosuke Tashiro, Shizuoka (JP); Maki Yamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/931,499

(22) Filed: Oct. 30, 2024

(65) Prior Publication Data

US 2025/0054654 A1 Feb. 13, 2025

Related U.S. Application Data

(63) Continuation of application No. PCT/JP2023/036283, filed on Oct. 4, 2023.

(30) Foreign Application Priority Data

Oct. 5, 2022 (JP) ................................ 2022-161080

(51) Int. Cl.

| | |
|---|---|
| ***H01B 7/02*** | (2006.01) |
| ***H01B 3/30*** | (2006.01) |
| ***H01B 13/14*** | (2006.01) |

(52) U.S. Cl.

CPC ........... *H01B 7/0275* (2013.01); *H01B 3/307* (2013.01); *H01B 7/0225* (2013.01); *H01B 13/141* (2013.01); *H01B 13/148* (2013.01)

(58) Field of Classification Search

CPC . H01B 3/30; H01B 3/307; H01B 3/16; H01B 7/02; H01B 7/0225; H01B 7/0275; H01B 7/29; H01B 7/295; H01B 11/08; H01B 13/06; H01B 13/14; H01B 13/141; H01B 13/148; C08F 10/06; C08F 32/04; C08J 9/10; C08J 9/103; C08J 9/12;

(Continued)

(56) References Cited

U.S. PATENT DOCUMENTS 4,204,086 A * 5/1980 Suzuki .................. B29C 44/322 264/171.19
4,352,701 A * 10/1982 Shimba ................. B29C 44/322 174/110 PM (Continued)

FOREIGN PATENT DOCUMENTS

JP 07282662 A * 10/1995 ............. H01B 13/16
JP 2006045268 A * 2/2006 ............... H01B 7/02

(Continued)

*Primary Examiner* — William H. Mayo, III
(74) *Attorney, Agent, or Firm* — Sughrue Mion, PLLC

(57) ABSTRACT

A foamed electric wire includes a conductor, and a covering layer that covers the conductor and is constituted by one or more layers. At least one layer of the covering layer is a foamed covering layer made of a resin composition containing a polypropylene resin, that is formed by foam extrusion molding. An average foam diameter of the foamed covering layer is 30 μm or less in a cross-sectional direction, and 60 μm or less in a longitudinal direction. A foaming ratio of the foamed covering layer is 25% or more and 55% or less. An arithmetic average height of a surface of the foamed electric wire is 20 μm or less.

5 Claims, 1 Drawing Sheet

(58) Field of Classification Search
CPC .......... C08L 23/04; C08L 23/14; C08L 23/08; C08L 23/26
USPC ..................... 174/28, 102 R, 110 R–110 PM, 174/120 R–120 C; 521/56, 59, 97, 123, 521/128, 130, 133, 140, 142, 143, 150, 521/232, 336; 428/383, 461
See application file for complete search history.

(56) References Cited

U.S. PATENT DOCUMENTS 4,468,435 A * 8/1984 Shimba ................ B29C 44/322 264/45.9
5,574,074 A * 11/1996 Zushi ..................... H01B 3/441 521/97
2010/0105787 A1* 4/2010 Sasaki ...................... C08J 9/232 521/59
2014/0088214 A1* 3/2014 Okamoto .............. B29B 7/7495 525/232
2016/0194471 A1* 7/2016 Yachi ....................... C08J 9/103 521/143

FOREIGN PATENT DOCUMENTS

JP 2011238584 A * 11/2011 ............... H01B 7/02
JP 5420662 B2 2/2014

* cited by examiner

FOAMED ELECTRIC WIRE, COMMUNICATION CABLE, AND METHOD OF MANUFACTURING THE SAME

CROSS-REFERENCE TO RELATED APPLICATIONS

The present application is a continuation of International Application No. PCT/JP2023/036283, filed on Oct. 4, 2023, and based upon and claims the benefit of priority from Japanese Patent Application No. 2022-161080, filed on Oct. 5, 2022, the entire contents of which are incorporated herein by reference.

TECHNICAL FIELD

The present application relates to a foamed electric wire, a communication cable, and a method of manufacturing the same.

BACKGROUND

In a physical foaming extrusion process using an inert gas for a small-diameter electric wire of a foamed electric wire useful as a high-speed communication cable for the GHz band, it has been considered that foaming is difficult to control, and communication characteristics tend to deteriorate due to variations in foaming. Therefore, a conventional chemical foaming process is often used, in which the formation of foaming is relatively gentle and a foam diameter is easily stabilized. Japanese Patent No. 5420662 discloses that a foamed covering layer is formed by kneading a base resin, and a masterbatch containing a heat decomposition type chemical foaming agent and a polypropylene-based resin, and the foam diameter and foaming ratio are controlled by controlling the melt tension of the resin, for example.

SUMMARY OF THE INVENTION

However, in Japanese Patent No. 5420662, the chemical foaming agent is kneaded into the masterbatch, and they are mixed by means of a foaming extrusion process. Therefore, dispersion of the chemical foaming agent during melting is poor, and it has been difficult to achieve a uniform foam diameter. In addition, since it is necessary to sufficiently melt the foaming agent and the masterbatch in a cylinder, there have been problems that the production rate is low, and production efficiency is low. Further, since azodicarbonamide (ADCA) is used as the chemical foaming agent, there has been a problem that it is not possible to conform with the REACH regulations.

An object of the present application is to provide a foamed electric wire excellent in abrasion resistance and resistance to heat distortion, which is designed for an on-vehicle environment, while ensuring communication stability, and which enables control of a foam diameter even with a physical foaming process using an inert gas. Further, an object of the present application is to provide a communication cable using the foamed electric wire, and a method of manufacturing the same.

A foamed electric wire according to an aspect of the present application includes: a conductor; and a covering layer that covers the conductor and is constituted by one or more layers, in which at least one layer of the covering layer is a foamed covering layer made of a resin composition containing a polypropylene resin, that is formed by foam extrusion molding, an average foam diameter of the foamed covering layer is 30 μm or less in a cross-sectional direction, and 60 μm or less in a longitudinal direction, a foaming ratio of the foamed covering layer is 25% or more and 55% or less, and an arithmetic average height of a surface of the foamed electric wire is 20 μm or less.

A communication cable according to another aspect of the present application includes the foamed electric wire described above.

A method of manufacturing a foamed electric wire according to another aspect of the present application includes: a step of forming a covering layer that covers a conductor and is constituted by one or more layers; and a step of forming a foamed covering layer made of a resin composition containing a polypropylene resin, that is formed by foam extrusion molding, as at least one layer of the covering layer, in which an average foam diameter of the foamed covering layer is 30 μm or less in a cross-sectional direction, and 60 μm or less in a longitudinal direction, a foaming ratio of the foamed covering layer is 25% or more and 55% or less, and an arithmetic average height of a surface of the foamed electric wire is 20 μm or less.

According to the present application, it is possible to provide a foamed electric wire excellent in abrasion resistance and resistance to heat distortion, which is designed for an on-vehicle environment, while ensuring communication stability, and which enables control of a foam diameter even with a physical foaming process using an inert gas. Further, it is possible to provide a communication cable using the foamed electric wire, and a method of manufacturing the same.

DETAILED DESCRIPTION OF THE INVENTION

A foamed electric wire according to the present embodiment will be described in detail below with reference to the drawings. The dimensional ratios of the drawings are exaggerated for convenience of explanation and may differ from the actual ratio.

[Foamed Electric Wire]

A foamed electric wire of the present embodiment includes a conductor and covering layers covering the conductor. The covering layers are constituted by one or more layers. At least one layer of the covering layers is a foamed covering layer made of a resin composition containing a polypropylene resin, which is formed by means of foam extrusion molding. It is preferable that the foamed covering layer is formed by means of foam extrusion molding (physical foaming process) using an inert gas.

Figure 1:
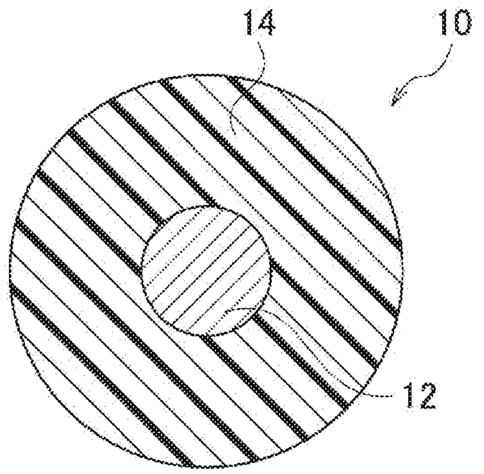
FIG. 1 illustrates an example of a case where a covering layer of a foamed electric wire according to the present embodiment is a single layer, and is a cross-sectional view taken perpendicular to a longitudinal direction of the foamed electric wire.

As illustrated in FIG. 1, a foamed electric wire 10 includes a conductor 12 and a foamed covering layer 14 covering an outer periphery of the conductor 12. The conductor 12 and foamed covering layer 14 form an insulated electric wire. As illustrated in FIG. 1, when a covering layer of the foamed electric wire 10 is a single layer, the conductor 12 of the foamed electric wire 10 is covered only with the foamed covering layer 14. This kind of foamed electric wire 10 having a single covering layer can be fabricated by covering the conductor 12 with a resin composition containing a polypropylene resin by means of foam extrusion molding.

Figure 2:
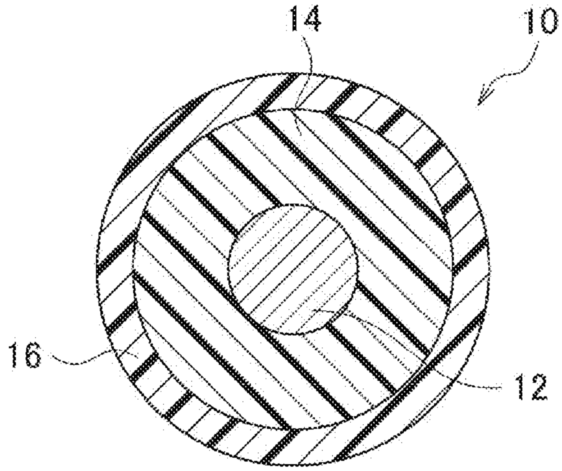
FIG. 2 illustrates an example of a case where the covering layer of the foamed electric wire according to the present embodiment has two layers, and is a cross-sectional view taken perpendicular to the longitudinal direction of the foamed electric wire.

As illustrated in FIG. 2, when the covering layer of the foamed electric wire 10 has two layers, the foamed electric wire 10 includes the conductor 12, the foamed covering layer 14 covering an outer periphery of the conductor 12, and a skin layer 16 covering an outer periphery of the foamed covering layer 14. Similar to the foamed electric wire having a single covering layer, the foamed covering layer 14 of the foamed electric wire 10 having two covering layers is formed by covering the conductor 12 with a resin composition containing a polypropylene resin by means of foam extrusion molding. Meanwhile, the skin layer 16 can be formed by means of a general extrusion molding method, but from the viewpoint of enhancing productivity, it is preferable to form the foamed covering layer 14 and skin layer 16 by means of co-extrusion.

Figure 3:
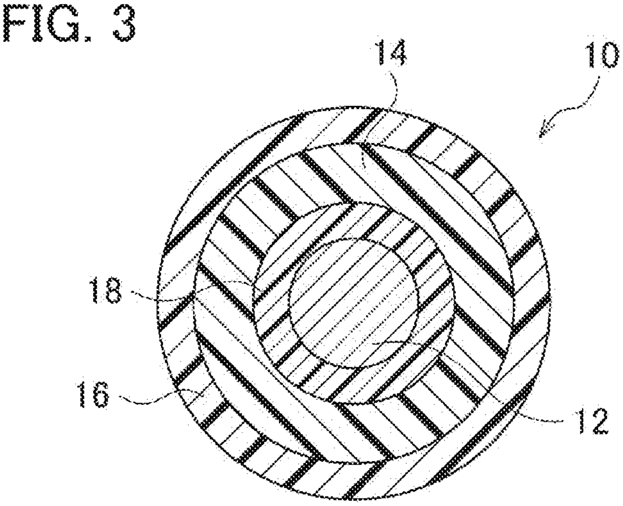
FIG. 3 illustrates an example of a case where the covering layer of the foamed electric wire according to the present embodiment has three layers, and is a cross-sectional view taken perpendicular to the longitudinal direction of the foamed electric wire.

As illustrated in FIG. 3, when the covering layer of the foamed electric wire 10 has three layers, the foamed electric wire 10 includes the conductor 12, an inner layer 18 covering an outer periphery of the conductor 12, the foamed covering layer 14 covering an outer periphery of the inner layer 18, and a skin layer 16 covering an outer periphery of the foamed covering layer 14. In order to fabricate the foamed electric wire 10 having three covering layers, first the conductor 12 is covered with the inner layer 18 by means of extrusion molding. Then, as described above, in the same manner as when the foamed electric wire 10 has two covering layers, the foamed electric wire can be fabricated by covering the inner layer 18 with the foamed covering layer 14 and skin layer 16.

The covering layer of the foamed electric wire 10 may have four or more layers. Further, there are no particular limitations on the number of covering layers, or on the configuration of the foamed electric wire 10. It is not necessary for an outer layer or an inner layer of the foamed covering layer 14 to include a non-foamed layer, and the covering layer of the foamed electric wire 10 may be formed only of the foamed covering layer 14.

The arithmetic average height of a surface of the foamed electric wire 10 is 20 μm or less. The arithmetic average height is a parameter for evaluating three-dimensional surface properties (surface roughness). Due to the arithmetic average height being 20 μm or less, it is possible to ensure abrasion resistance when used as a communication cable. The arithmetic average height of the surface of the foamed electric wire 10 is measured as an arithmetic average height Sa by analyzing an image of the surface of the foamed electric wire 10 captured using a 3D Optical Profilometer (manufactured by KEYENCE CORPORATION) or the like in accordance with international standard ISO 25178 defining evaluation methods for surface roughness.

[Foamed Covering Layer]

The foamed covering layer 14 is made of a resin composition containing a polypropylene resin. Examples of the polypropylene resin used in the resin composition include homopolypropylene (homo PP), random polypropylene (random PP), block polypropylene (block PP), and copolymers with components such as other olefins that are copolymerizable with propylene. Examples of other olefins copolymerizable with propylene include α-olefins such as ethylene, 1-butene, isobutylene, 1-pentene, 3-methyl-1-butene, 1-hexene, 3,4-dimethyl-1-butene, 1-heptene, and 3-methyl-1-hexene.

The melt tension of the resin composition measured using a capillary rheometer at 200° C. is 15 mN or more and 45 mN or less, and preferably 18 mN or more and 35 mN or less. Due to the melt tension of the resin composition being 15 mN or more, foam breakage on the surface of the foamed covering layer is prevented, and the surface of the foamed covering layer is less likely to be roughened. In addition, due to the melt tension of the resin composition being 45 mN or less, a foam is prevented from extending excessively in a longitudinal direction of the foamed electric wire, it becomes easy for a foam to continue to have a spherical shape, and communication stability when used as a communication cable can be ensured. The melt tension can be measured using a capillary rheometer such as CAPILOGRAPH (registered trademark) (manufactured by Toyo Seiki Seisaku-sho, Ltd.).

The melt viscosity of the resin composition measured using a capillary rheometer at 200° C. is 120 Pa·s or more and 200 Pa·s or less, and preferably 130 Pa·s or more and 170 Pa's or less. Due to the melt viscosity of the resin composition being 120 Paes or more, formation of a foam becomes favorable. Further, due to the melt viscosity of the resin composition being 200 Pa·s or less, foams are prevented from coalescing, and a foam diameter can be easily controlled to be a desired foam diameter. The melt viscosity can be measured in accordance with JIS K 7199:1999 using a capillary rheometer such as CAPILOGRAPH (registered trademark) (manufactured by Toyo Seiki Seisaku-sho, Ltd.).

An average foam diameter of the foamed covering layer 14 is 30 μm or less in a cross-sectional direction of the foamed electric wire 10, and 60 μm or less in a longitudinal direction of the foamed electric wire 10. Further, the average foam diameter of the foamed covering layer 14 is preferably 20 μm or less in the cross-sectional direction of the foamed electric wire 10, and 55 μm or less in the longitudinal direction of the foamed electric wire 10. Due to the average foam diameter of the foamed covering layer 14 being 30 μm or less in the cross-sectional direction, and 60 μm or less in the longitudinal direction, it becomes easy to form nearly spherical and fine foams with a uniform foam diameter. Therefore it is possible to ensure communication stability when used as a communication cable. The average foam diameter can be confirmed by observing a cut surface, obtained by cutting out the foamed electric wire 10 in the cross-sectional direction or the longitudinal direction, using an electron microscope, measuring diameters of foams, and calculating an average value thereof. Alternatively, the average foam diameter can be confirmed by nondestructively observing a cut surface, obtained by cutting out the foamed electric wire 10 in the cross-sectional direction or the longitudinal direction, using an X-ray microscope CT, measuring diameters of foams, and calculating an average value thereof.

The foaming ratio of the foamed covering layer 14 is 25% or more and 55% or less. The characteristic impedance of an in-vehicle communication cable is preferably in a range from 95Ω to 105Ω. Due to the foaming ratio of the foamed covering layer 14 being 25% or more and 55% or less, the characteristic impedance of the foamed electric wire 10 can be controlled to be within the above range. Taking the area occupied by foams in a cross-sectional area of the foamed covering layer 14 as the foaming ratio, the foaming ratio can be confirmed in the same manner as the average foam diameter by observing a cut surface of the foamed electric wire 10, and calculating average values of foaming ratios in the cross-sectional direction and the longitudinal direction.

The foamed covering layer 14 is preferably formed by means of foam extrusion molding using an inert gas. Specifically, at the time of molding, an inert gas such as a foaming agent is injected into a heated and melted resin composition to perform foaming. The foaming ratio described above can be controlled by adjusting the injection amount, temperature, and inert gas pressure.

Examples of the inert gas used for the foam extrusion molding include a nitrogen gas, a carbon dioxide gas, an argon gas, water vapor, a helium gas, and an isobutane gas. From the viewpoint of solubility to a polypropylene resin and consideration for the environment, the inert gas is preferably at least one selected from the group consisting of a nitrogen gas, a carbon dioxide gas, and an argon gas, and more preferably a nitrogen gas or a carbon dioxide gas. A nitrogen gas or a carbon dioxide gas is used for general foam extrusion molding of a polypropylene resin. One inert gas may be used alone, or two or more may be used in combination.

In addition to a polypropylene resin, an appropriate amount of various additives can be added to a resin composition to the extent that effects of the present embodiment are not inhibited. Examples of additives include flame retardants, inorganic fillers, flame retardant aids, antioxidants, processing aids, cross-linking agents, metal deactivators, copper inhibitors, anti-aging agents, fillers, reinforcing agents, ultraviolet absorbers, stabilizers, plasticizers, pigments, dyes, colorants, and antistatic agents.

(Flame Retardant)

A flame retardant enhances the flame retardancy of a resin composition. The flame retardant may be at least either an organic flame retardant or an inorganic flame retardant, for example. As an organic flame retardant, it is possible to use halogen-based flame retardants such as bromine-based flame retardants and chlorine-based flame retardants, and phosphorus-based flame retardants such as phosphate esters, condensed phosphate esters, cyclic phosphorus compounds, and red phosphorus, for example. As an inorganic flame retardant, it is possible to use at least one metal hydroxide selected from the group consisting of aluminum hydroxide, magnesium hydroxide, and calcium hydroxide. One of the flame retardants may be used alone, or a mixture of a plurality of flame retardants may be used. The flame retardant may include an organic flame retardant and an inorganic flame retardant, for example. The added amount of a flame retardant may be adjusted appropriately in consideration of a flame retardant effect, and the influence on mechanical properties.

(Antioxidant)

An antioxidant suppresses oxidation of a resin composition. As the antioxidant, it is possible to use known antioxidants used for thermoplastic resins and the like, including radical chain inhibitors such as phenol-based antioxidants, hindered phenol-based antioxidants, and amine-based antioxidants; peroxide decomposers such as phosphorus-based antioxidants and sulfur-based antioxidants; and metal deactivators such as hydrazine-based antioxidants and amine-based antioxidants. One of the antioxidants may be used alone, or a mixture of a plurality of antioxidants may be used. The added amount of an antioxidant may be adjusted appropriately in consideration of an antioxidant effect, and any defects caused by bleed-out.

(Copper Inhibitor)

When copper or a copper alloy is used for the conductor 12, copper may cause degradation of the covering layers of the foamed electric wire 10, which is referred to as copper harm. For this reason, a copper inhibitor can be added to a resin constituting the covering layers of the foamed electric wire 10. As the copper inhibitor, a salicyl-based copper inhibitor or a hydrazine-based copper inhibitor is used, for example. The added amount of a copper inhibitor may be adjusted appropriately in consideration of a copper harm prevention effect, and any defects caused by bleed-out.

As a method for adding the above described additive to the polypropylene resin to obtain the resin composition, known means can be used. The resin composition can be obtained by kneading the resin and additive using a known kneading device such as a banbury mixer, a kneader, a roll mill, a twin-screw extruder, or a single-screw extruder, for example.

[Conductor]

As the conductor 12, a single wire constituted by one element wire may be used, or a twisted wire conductor formed by twisting a plurality of element wires may be used. For the twisted wire conductor, it is possible to use all of a concentric twisted wire in which element wires around one or several element wires are concentrically twisted; an aggregated twisted wire in which a plurality of element wires are collectively twisted in the same direction; and a composite twisted wire in which a plurality of aggregated twisted wires are concentrically twisted. There are no particular limitations on a diameter of the conductor and a diameter of each element wire constituting the twisted wire conductor. The conductor 12 may be a compressed conductor or an uncompressed conductor. Further, there are no particular limitations on materials of the conductor and the twisted wire conductor, and it is possible to use known conductive metal materials such as copper, a copper alloy, aluminum, and an aluminum alloy, for example. Still further, surfaces of the conductor and the twisted wire conductor may be plated, and tin plating, silver plating, or nickel plating may be applied thereto.

An outer diameter of the conductor 12 is not particularly limited, but the outer diameter is preferably 0.45 mm or more. Due to the outer diameter of the conductor 12 being 0.45 mm or more, it is possible to reduce the resistance of the conductor 12. Further, it is preferable that the outer diameter of the conductor 12 is 0.80 mm or less. Due to the outer diameter of the conductor 12 being 0.80 mm or less, the foamed electric wire 10 can be easily arranged in a path even if the path is narrow and short.

[Skin Layer]

There are no particular limitations on the material and thickness of the skin layer 16 constituting an outermost layer portion of the foamed electric wire 10 illustrated in FIGS. 2 and 3, as long as electrical insulation to the conductor can be ensured. For the skin layer 16, it is possible to optionally use electrically insulating resins including olefin resins such as cross-linked polyethylene and polypropylene, and vinyl chloride resins. Specifically, as a resin material constituting the skin layer 16, it is possible to use polyvinyl chloride, heat-resistant polyvinyl chloride, cross-linked polyvinyl chloride, polyethylene, cross-linked polyethylene, foamed polyethylene, cross-linked foamed polyethylene, chlorinated polyethylene, polypropylene, polyamide (nylon), polyvinylidene fluoride, ethylene-tetrafluoroethylene copolymer, tetrafluoroethylene-hexafluoropropylene copolymer, tetrafluoroethylene, perfluoroalkoxyalkane, natural rubber, chloroprene rubber, butyl rubber, ethylene-propylene rubber, chlorosulfonated polyethylene rubber, or silicone rubber, for example. One of the materials may be used alone, or two or more may be used in combination.

As illustrated in FIGS. 2 and 3, the foamed covering layer 14 can be covered with the skin layer 16 using known means. The skin layer 16 can be formed by means of a general extrusion molding method, for example. As an extruder used for the extrusion molding method, it is possible to use a single-screw extruder or twin-screw extruder having a screw, a breaker plate, a crosshead, a distributor, a nipple, and a die, for example. When extrusion molding is performed, a resin material is put into an extruder set at a temperature at which a resin sufficiently melts. At this time, in addition to the resin material, various additives to be added to the above-described resin composition, such as an antioxidant, can be put into the extruder if necessary.

[Inner Layer]

There are no particular limitations on the material and thickness of the inner layer 18 covering the conductor 12 illustrated in FIG. 3, as long as electrical insulation to the conductor 12 can be ensured, and it is possible to use resin materials similar to those for the above-described skin layer 16. Further, the conductor 12 can be covered with the inner layer 18 using known means, and a general extrusion molding method can be used as in the case of forming above-described skin layer 16.

As described above, the foamed electric wire 10 includes the conductor 12 and the covering layers, which cover the conductor 12 and which are constituted by one or more layers. At least one layer of the covering layers is the foamed covering layer 14 made of a resin composition containing a polypropylene resin, which is formed by means of foam extrusion molding. The average foam diameter of the foamed covering layer 14 is 30 μm or less in the cross-sectional direction, and 60 μm or less in the longitudinal direction. The foaming ratio of the foamed covering layer 14 is 25% or more and 55% or less. The arithmetic average height of the surface of the foamed electric wire 10 is 20 μm or less. Therefore, it is possible to control the foam diameter even by a physical foaming process using an inert gas, and it is possible to provide a foamed electric wire excellent in abrasion resistance and resistance to heat distortion, which is designed for an on-vehicle environment while ensuring communication stability.

Further, as described above, a method of manufacturing the foamed electric wire 10 includes a step of forming covering layers which cover the conductor 12 and which are constituted by one or more layers, and a step of forming the foamed covering layer 14 made of a resin composition containing a polypropylene resin, which is formed by means of foam extrusion molding as at least one layer of the covering layers. The average foam diameter of the foamed covering layer 14 is 30 μm or less in the cross-sectional direction, and 60 μm or less in the longitudinal direction. The foaming ratio of the foamed covering layer 14 is 25% or more and 55% or less. The arithmetic average height of the surface of the foamed electric wire 10 is 20 μm or less.

[Communication Cable]

The communication cable according to the present embodiment includes the foamed electric wire 10 described above. The communication cable can be fabricated by means of a known method, and can be fabricated by means of a general extrusion molding method, for example. Specifically, a sheath can be formed by bundling one or more foamed electric wires 10, and then extruding a sheath material onto the outer surface of the foamed electric wires 10 and covering the outer surface. The communication cable having the foamed electric wire 10 may be used as a coaxial cable or as a twisted pair cable. Further, as a resin used for the sheath of the communication cable, it is possible to optionally use known insulating resins including olefin resins such as cross-linked polyethylene and polypropylene, and vinyl chloride, and a plasticizer may be included. As the plasticizer, it is possible to use a known plasticizer added to polyvinyl chloride.

The communication cable according to the present embodiment includes the foamed electric wire 10. Due to the foamed electric wire 10, it is possible to control the foam diameter even by a physical foaming process using an inert gas. The foamed electric wire 10 has excellent abrasion resistance and resistance to heat distortion, and is designed for an on-vehicle environment while ensuring communication stability. Therefore, the communication cable including this kind of foamed electric wire 10 can be preferably used as an on-vehicle transmission cable, for example.

EXAMPLES

The present embodiment will be described in additional detail below by means of examples and comparative examples, but the present embodiment is not limited to these examples.

[Resin Composition]

(Resin)

PP1: Polypropylene: manufactured by Japan Polypropylene Corporation, Product name: WAYMAX (registered trademark) EX4000

PP2: Polypropylene: manufactured by Prime Polymer Co., Ltd., Product name: Prime Polypro (registered trademark) E150GK PP3: Polypropylene: manufactured by Prime Polymer Co., Ltd., Product name: Prime Polypro (registered trademark) J715M PP4: Polypropylene: manufactured by Prime Polymer Co., Ltd., Product name: Prime Polypro (registered trademark) J-452HP PP5: Polypropylene: manufactured by SunAllomer Ltd., Product name: Qualear (registered trademark) CM688A EP1: Soft polypropylene (propylene/ethylene copolymer resin): manufactured by SunAllomer Ltd., Product name: Adflex (registered trademark) Q200F PE1: Low density polyethylene (LDPE): manufactured by DOW-MITSUI POLYCHEMICALS CO., LTD., Product name: MIRASON (registered trademark) 3530

(Antioxidant)

Phenol-based antioxidant: manufactured by ADEKA CORPORATION, Product name: ADK STAB (registered trademark) AO-60

(Copper Inhibitor)

Hydrazine-based copper inhibitor: manufactured by BASF SE, Product name: IRGANOX (registered trademark) MD1024

[Evaluation of Resin Composition]

Resin compositions of Examples 1 to 10 and Comparative Examples 1 to 7 were fabricated by melt-kneading the above-described resins, antioxidant, and copper inhibitor in the blend amounts shown in Tables 1 and 2. Then, as material properties of each resin composition, the melt tension and melt viscosity were measured by means of the following method. Tables 1 and 2 show evaluation results.

(Melt Tension)

The melt tension was measured using CAPILOGRAPH (registered trademark) (manufactured by Toyo Seiki Seisaku-sho, Ltd.). Specifically, a capillary L/D was set to 10, and a furnace temperature was set to 200° C. After adding materials, the materials were held for 3 minutes and dissolved. A resin was extruded at a piston speed of 20 mm/min, and the resin was taken up by a take-up roller (manufactured by Toyo Seiki Seisaku-sho, Ltd.) in speed increments of 10 mm/min, while a take-up speed was increased in a range from 10 to 200 mm/min. The resin was held for 30 seconds at each take-up speed, and if the resin had not severed, the take-up speed was changed to a next take-up speed. The tension when the resin severed was set to be the melt tension.

(Melt Viscosity)

The melt viscosity was measured using CAPILOGRAPH (registered trademark) (manufactured by Toyo Seiki Seisaku-sho, Ltd.). As measurement conditions, a capillary L/D was set to 10, and a furnace temperature was set to 200° C. A value measured at a piston speed of 100 mm/min when the piston speed was changed to values of 300 mm/min, 200 mm/min, 100 mm/min, 50 mm/min, and 10 mm/min was set as the melt viscosity.

TABLE 1

| | | Example 1 | Example 2 | Example 3 | Example 4 | Example 5 |
|---|---|---|---|---|---|---|
| Resin composition | PP1 | 20 | — | 30 | 60 | 70 |
| | PP2 | — | — | — | — | — |
| | PP3 | 80 | 70 | 70 | 40 | 30 |
| | PP4 | — | 30 | — | — | — |
| | PP5 | — | — | — | — | — |
| | EP1 | — | — | — | — | — |
| | PE1 | — | — | — | — | — |
| | Antioxidant | 0.1 | 0.1 | 0.1 | 0.1 | 0.1 |
| | Copper inhibitor | 0.1 | 0.1 | 0.1 | 0.1 | 0.1 |
| Material properties | Melt tension (mN) | 15 | 15 | 18 | 29 | 32 |
| | Melt viscosity (Pa · s) | 120 | 125 | 130 | 135 | 160 |

| | | Example 6 | Example 7 | Example 8 | Example 9 | Example 10 |
|---|---|---|---|---|---|---|
| Resin composition | PP1 | — | 80 | — | — | 80 |
| | PP2 | — | — | — | — | 20 |
| | PP3 | — | 20 | 60 | 50 | — |
| | PP4 | 100 | — | — | — | — |
| | PP5 | — | — | — | — | — |
| | EP1 | — | — | 40 | 50 | — |
| | PE1 | — | — | — | — | — |
| | Antioxidant | 0.1 | 0.1 | 0.1 | 0.1 | 0.1 |
| | Copper inhibitor | 0.1 | 0.1 | 0.1 | 0.1 | 0.1 |
| Material properties | Melt tension (mN) | 18 | 35 | 15 | 25 | 45 |
| | Melt viscosity (Pa · s) | 150 | 170 | 180 | 200 | 200 |

TABLE 2

| | | Comparative Example 1 | Comparative Example 2 | Comparative Example 3 | Comparative Example 4 | Comparative Example 5 |
|---|---|---|---|---|---|---|
| Resin composition | PP1 | — | — | — | 10 | 20 |
| | PP2 | — | — | 100 | — | — |
| | PP3 | — | 100 | — | 90 | 80 |
| | PP4 | — | — | — | — | — |
| | PP5 | 100 | — | — | — | — |
| | EP1 | — | — | — | — | — |
| | PE1 | — | — | — | — | — |
| | Antioxidant | 0.1 | 0.1 | 0.1 | 0.1 | 0.1 |
| | Copper inhibitor | 0.1 | 0.1 | 0.1 | 0.1 | 0.1 |
| Material properties | Melt tension (mN) | 9 | 7 | 15 | 14 | 15 |
| | Melt viscosity (Pa · s) | 110 | 120 | 350 | 120 | 120 |

| | | Comparative Example 6 | Comparative Example 7 | Comparative Example 8 | Comparative Example 9 |
|---|---|---|---|---|---|
| Resin composition | PP1 | 80 | 20 | 100 | — |
| | PP2 | 20 | — | — | — |
| | PP3 | — | — | — | — |
| | PP4 | — | — | — | — |
| | PP5 | — | — | — | — |
| | EP1 | — | — | — | — |
| | PE1 | — | 80 | — | 100 |
| | Antioxidant | 0.1 | 0.1 | 0.1 | 0.1 |
| | Copper inhibitor | 0.1 | 0.1 | 0.1 | 0.1 |
| Material properties | Melt tension (mN) | 45 | 45 | 50 | 51 |
| | Melt viscosity (Pa · s) | 200 | 210 | 170 | 280 |

[Evaluation of Foamed Electric Wire]

The foamed electric wire (three-layer insulated electric wire) illustrated in FIG. 3 was fabricated by means of the following method using the resin compositions of Examples 1 to 10 and Comparative Examples 1 to 9.

In the method of fabricating the foamed electric wire, a polypropylene-based resin was first extrusion-molded (at an extruder temperature of 170° C. to 220° C.) onto a compressed or uncompressed twisted wire conductor (with an outer diameter of 0.45 mm to 0.80 mm), and the conductor was covered with an inner layer having a thickness of 0.03 mm to 0.1 mm. Using the electric wire, the resin compositions of Examples 1 to 10 and Comparative Examples 1 to 9 were covered by means of foam extrusion molding, while an outer diameter of the electric wire was in a range from 1.00 mm to 2.20 mm, and accordingly a foamed covering layer was formed. The temperature of the extruder used for the foam extrusion molding was set to be in a range from 170° C. to 220° C., and a high-pressure nitrogen gas obtained by pressurizing with a gas booster was injected from a middle portion of the extruder, and mixed. At this time, fabrication of the electric wire was performed under conditions where the foaming ratio of the foamed covering layer was a low foaming ratio (25% or 20%) and a high foaming ratio (55% or 60%), as shown in Tables 3 and 4. Further, a polypropylene-based resin was extrusion-molded by a sub-extruder (set temperature of 210° C. to 240° C.) at the same time as the foamed covering layer, and the foamed covering layer was covered with a skin layer having a thickness of 0.03 mm to 0.1 mm. The foaming ratio, average foam diameter, arithmetic average height, resistance to abrasion, heat distortion, LCTL, and characteristic impedance were evaluated by means of the following method as characteristics of the foamed electric wire obtained in this way. Tables 3 and 4 show evaluation results.

(Foaming Ratio and Average Foam Diameter)

A CT image of the foamed electric wire (in the cross-sectional and longitudinal directions) was captured using an X-ray microscope CT (nano3DX). Image capturing conditions were as follows: spatial resolution 4.31 μm/voxel, X-ray camera lens L1080, binning 3, exposure time 4 seconds, X-ray source Cu (40 kV, 30 mA), field of view 3.626 mm*2.719 mm, and the number of images captured 400. The foaming ratio and average foam diameter were calculated as average values for the captured image using analysis software ImageJ.

(Arithmetic Average Height)

An image of a surface of the foamed electric wire was captured using a 3D Optical Profilometer (manufactured by KEYENCE CORPORATION), and the arithmetic average height Sa of the surface of the foamed electric wire was calculated using analysis software. Image capturing conditions were as follows: magnifying power 25, measuring range 10*10 mm, and number of images captured 5.

(Resistance to Abrasion)

An abrasion resistance test was performed in accordance with a scrape abrasion test specified in ISO 19642-12. Specifically, a needle was applied perpendicularly to a test sample of the cut out foamed electric wire, the covering layer was worn by reciprocating the needle with a fixed load (4 N), and the number of reciprocations until the needle contacts with the conductor was measured. When the number of reciprocations until the needle contacts with the conductor was 300 or more, it was evaluated as high pass (symbol ◎) when the number of reciprocations was 100 or more and less than 300, it was evaluated as pass (symbol ○), and when the number of reciprocations was less than 100, it was evaluated as fail (symbol x).

(Heat Distortion)

A heat distortion resistance test was performed in accordance with a high-temperature pressure test specified in ISO 19642-12. Specifically, a fixed load was applied to a test sample of the cut out foamed electric wire from above at a set temperature of 100° C. (class B) for four hours, and then a voltage of 1 kV was applied to a conductor of the test sample using a withstand voltage device to perform a withstand voltage test. The applied load varies depending on the thickness of the covering layer and the outer diameter of the electric wire, and can be determined based on the following formula (1). When insulation was maintained for one minute, it was evaluated as pass (symbol ○), and when insulation was maintained for less than one minute, it was evaluated as fail (symbol x).

$$\text{Load } (N) = 0.8 * (\text{thickness of covering layer} * (2 * \text{outer diameter of electric wire} - \text{thickness of covering layer}))^{0.5} \quad (1)$$

(LCTL)

The communication stability when used as a communication cable was evaluated by longitudinal conversion transfer loss (LCTL). Specifically, two foamed electric wires were twisted with a pitch of 30 mm and a metal film was vertically disposed, or horizontally wrapped around them. Then a tin-plated soft copper wire braid was covered, and a vinyl chloride resin (PVC) with a thickness of 0.5 mm was covered thereon as a sheath to fabricate a test sample. For the obtained test sample, the same voltage was applied to the two foamed electric wires using a network analyzer, and LCTL was calculated by converting the ratio of potential differences caused by imbalance of the foamed electric wires into decibels. When LCTL was 18 dB/m or less, it was evaluated as high pass (symbol ◎) when LCTL was 20 dB/m or less, it was evaluated as pass (symbol ○), and when LCTL was more than 20 dB/m, it was evaluated as fail (symbol x).

(Characteristic Impedance)

The communication stability when used as a communication cable was evaluated by the characteristic impedance. Specifically, the characteristic impedance of a test sample of the cut out foamed electric wire was measured using a vector network analyzer (VNA) (E5071C, manufactured by Keysight Technologies). When the characteristic impedance was in a range from 95 to 105Ω, it was evaluated as pass (symbol ○), and when the characteristic impedance was less than 95Ω or more than 105Ω, it was evaluated as fail (symbol x).

TABLE 3

| | | | Example 1 | Example 2 | Example 3 | Example 4 | Example 5 |
|---|---|---|---|---|---|---|---|
| Electric wire | Foaming ratio (%) | | 25 | 25 | 25 | 25 | 25 |
| charcteristics | Average foam | Cross-sectional direction | 29 | 29 | 20 | 15 | 13 |
| | diameter (μm) | Longitudinal direction | 40 | 40 | 45 | 50 | 53 |

TABLE 3-continued

| | | | | | | | |
|---|---|---|---|---|---|---|---|
| | Arithmetic average height (μm) | | 20 | 19 | 15 | 15 | 15 |
| | Resistance to abrasion | | ○ | ○ | ⊚ | ⊚ | ⊚ |
| | Heat distortion | | ○ | ○ | ○ | ○ | ○ |
| | LCTL | | ○ | ○ | ⊚ | ⊚ | ⊚ |
| | Characteristic impedance | | ○ | ○ | ○ | ○ | ○ |
| | Foaming ratio (%) | | 55 | 55 | 55 | 55 | 55 |
| | Average foam diameter (μm) | Cross-sectional direction | 30 | 30 | 22 | 16 | 15 |
| | | Longitudinal direction | 43 | 44 | 44 | 50 | 52 |
| | Arithmetic average height (μm) | | 19 | 19 | 17 | 15 | 15 |
| | Resistance to abrasion | | ○ | ○ | ○ | ⊚ | ⊚ |
| | Heat distortion | | ○ | ○ | ○ | ○ | ○ |
| | LCTL | | ○ | ○ | ○ | ⊚ | ⊚ |
| | Characteristic impedance | | ○ | ○ | ○ | ○ | ○ |
| | | | Example 6 | Example 7 | Example 8 | Example 9 | Example 10 |
| Electric wire charcteristics | Foaming ratio (%) | | 25 | 25 | 25 | 25 | 25 |
| | Average foam diameter (μm) | Cross-sectional direction | 20 | 12 | 30 | 20 | 10 |
| | | Longitudinal direction | 40 | 55 | 45 | 40 | 60 |
| | Arithmetic average height (μm) | | 17 | 14 | 20 | 16 | 14 |
| | Resistance to abrasion | | ○ | ⊚ | ○ | ○ | ⊚ |
| | Heat distortion | | ○ | ○ | ○ | ○ | ○ |
| | LCTL | | ○ | ⊚ | ○ | ⊚ | ○ |
| | Characteristic impedance | | ○ | ○ | ○ | ○ | ○ |
| | Foaming ratio (%) | | 55 | 55 | 55 | 55 | 55 |
| | Average foam diameter (μm) | Cross-sectional direction | 21 | 15 | 28 | 22 | 10 |
| | | Longitudinal direction | 42 | 54 | 46 | 45 | 50 |
| | Arithmetic average height (μm) | | 15 | 13 | 18 | 17 | 15 |
| | Resistance to abrasion | | ○ | ⊚ | ○ | ○ | ⊚ |
| | Heat distortion | | ○ | ○ | ○ | ○ | ○ |
| | LCTL | | ○ | ⊚ | ○ | ○ | ○ |
| | Characteristic impedance | | ○ | ○ | ○ | ○ | ○ |

TABLE 4

| | | | Comparative Example 1 | Comparative Example 2 | Comparative Example 3 | Comparative Example 4 | Comparative Example 5 |
|---|---|---|---|---|---|---|---|
| Electric wire charcteristics | Foaming ratio (%) | | 25 | 25 | — | 25 | 20 |
| | Average foam diameter (μm) | Cross-sectional direction | 38 | 35 | No foaming | 32 | 29 |
| | | Longitudinal direction | 45 | 40 | | 40 | 40 |
| | Arithmetic average height (μm) | | 33 | 30 | — | 22 | 20 |
| | Resistance to abrasion | | X | X | — | X | ○ |
| | Heat distortion | | ○ | ○ | ○ | ○ | ○ |
| | LCTL | | ○ | ○ | — | ○ | ○ |
| | Characteristic impedance | | ○ | ○ | ○ | ○ | X |
| | Foaming ratio (%) | | 55 | 55 | — | 55 | 60 |
| | Average foam diameter (μm) | Cross-sectional direction | 40 | 37 | No foaming | 33 | 30 |
| | | Longitudinal direction | 50 | 48 | | 42 | 43 |
| | Arithmetic average height (μm) | | 35 | 33 | — | 22 | 19 |
| | Resistance to abrasion | | X | X | — | X | ○ |
| | Heat distortion | | ○ | ○ | ○ | ○ | ○ |
| | LCTL | | ○ | ○ | — | ○ | ○ |
| | Characteristic impedance | | ○ | ○ | ○ | ○ | X |

| | | | Comparative Example 6 | Comparative Example 7 | Comparative Example 8 | Comparative Example 9 |
|---|---|---|---|---|---|---|
| Electric wire charcteristics | Foaming ratio (%) | | 20 | 25 | 25 | 25 |
| | Average foam diameter (μm) | Cross-sectional direction | 10 | 15 | 10 | 20 |
| | | Longitudinal direction | 60 | 55 | 70 | 65 |
| | Arithmetic average height (μm) | | 14 | 13 | 13 | 17 |
| | Resistance to abrasion | | ⊚ | ⊚ | ⊚ | ○ |
| | Heat distortion | | ○ | X | ○ | X |
| | LCTL | | ○ | ○ | X | X |
| | Characteristic impedance | | X | ○ | ○ | ○ |
| | Foaming ratio (%) | | 60 | 55 | 55 | 55 |
| | Average foam diameter (μm) | Cross-sectional direction | 10 | 12 | 15 | 21 |
| | | Longitudinal direction | 50 | 56 | 65 | 66 |
| | Arithmetic average height (μm) | | 15 | 12 | 12 | 17 |
| | Resistance to abrasion | | ⊚ | ⊚ | ⊚ | ○ |
| | Heat distortion | | ○ | X | ○ | X |
| | LCTL | | ○ | ○ | X | X |
| | Characteristic impedance | | X | ○ | ○ | ○ |

As shown in Table 1, the melt tension of the resin compositions of Examples 1 to 10 at 200° C. measured using a capillary rheometer was 15 mN or more and 45 mN or less, and the melt viscosity was 120 Pa·s or more and 200 Pa·s or less.

As shown in Table 3, in both cases where the foaming ratio was 25% and the foaming ratio was 55%, the average foam diameter of the foamed electric wire fabricated using the resin compositions of Examples 1 to 10 was 30 μm or less in the cross-sectional direction of the foamed electric wire, and 60 μm or less in the longitudinal direction of the foamed electric wire. Further, the arithmetic average height of the foamed electric wire was 20 μm or less, and results of resistance to abrasion, heat distortion, LCTL, and characteristic impedance were favorable.

Meanwhile, as shown in Table 2, the melt tension of the resin compositions of Comparative Examples 1, 2, 4, 8 and 9 at 200° C. measured using a capillary rheometer was less than 15 mN or more than 45 mN. Further, the melt viscosity of the resin compositions of Comparative Examples 1, 3, 7 and 9 at 200° C. measured using a capillary rheometer was less than 120 Pa·s or more than 200 Pa·s.

As shown in Table 4, in both cases where the foaming ratio was 25% and the foaming ratio was 55%, the average foam diameter of the foamed electric wire fabricated using the resin compositions of Comparative Examples 1, 2 and 4 was more than 30 μm in the cross-sectional direction. Meanwhile, in both cases where the foaming ratio was 25% and the foaming ratio was 55%, the average foam diameter of the foamed electric wire fabricated using the resin compositions of Comparative Examples 8 and 9 was more than 60 μm in the longitudinal direction. Further, in both cases where the foaming ratio was 25% and the foaming ratio was 55%, the arithmetic average height of the foamed electric wire fabricated using the resin compositions of Comparative Examples 1, 2 and 4 was more than 20 μm. The resin compositions of Comparative Examples 1, 2, 4 and 7 to 9 failed in any of the resistance to abrasion, heat distortion, and LCTL results. Further, Table 2 reveals that the melt tension of the resin compositions of Comparative Examples 5 and 6 was 15 mN or more and 45 mN or less, and the melt viscosity of the compositions was 120 Pa·s or more and 200 Pa·s or less. Table 4 reveals that the foaming ratio of the resin compositions of Comparative Examples 5 and 6 was 20% or 60%, and therefore the characteristic impedance of the compositions was failed. The resin composition of Comparative Example 3 could not be foamed, and therefore it was not able to fabricate a foamed electric wire.

Although the present embodiment has been described above, the present embodiment is not limited to the above description, and various modifications can be made within the scope of the gist of the present embodiment.

The entire contents of Japanese Patent Application No. 2022-161080 (filed on Oct. 5, 2022) are herein invoked.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A foamed electric wire comprising:

a conductor; and a covering layer that covers the conductor and is constituted by one or more layers, wherein at least one layer of the covering layer is a foamed covering layer made of a resin composition containing a polypropylene resin, that is formed by foam extrusion molding, an average foam diameter of the foamed covering layer is 30 μm or less in a cross-sectional direction, and 60 μm or less in a longitudinal direction, a foaming ratio of the foamed covering layer is 25% or more and 55% or less, and an arithmetic average height of a surface is 20 μm or less.

2. The foamed electric wire according to claim 1, wherein the foamed covering layer is formed by foam extrusion molding using an inert gas, and the resin composition has a melt tension of 15 mN or more and 45 mN or less measured using a capillary rheometer at 200° C., and a melt viscosity of 120 Pa·s or more and 200 Pa·s or less.

3. The foamed electric wire according to claim 2, wherein the inert gas is at least one selected from the group consisting of a nitrogen gas, a carbon dioxide gas and an argon gas.

4. A communication cable comprising:

the foamed electric wire according to claim 1.

5. A method of manufacturing a foamed electric wire comprising:

a step of forming a covering layer that covers a conductor and is constituted by one or more layers; and a step of forming a foamed covering layer made of a resin composition containing a polypropylene resin, that is formed by foam extrusion molding, as at least one layer of the covering layer, wherein an average foam diameter of the foamed covering layer is 30 μm or less in a cross-sectional direction, and 60 μm or less in a longitudinal direction, a foaming ratio of the foamed covering layer is 25% or more and 55% or less, and an arithmetic average height of a surface of the foamed electric wire is 20 μm or less.

* * * * *